Figure 1:
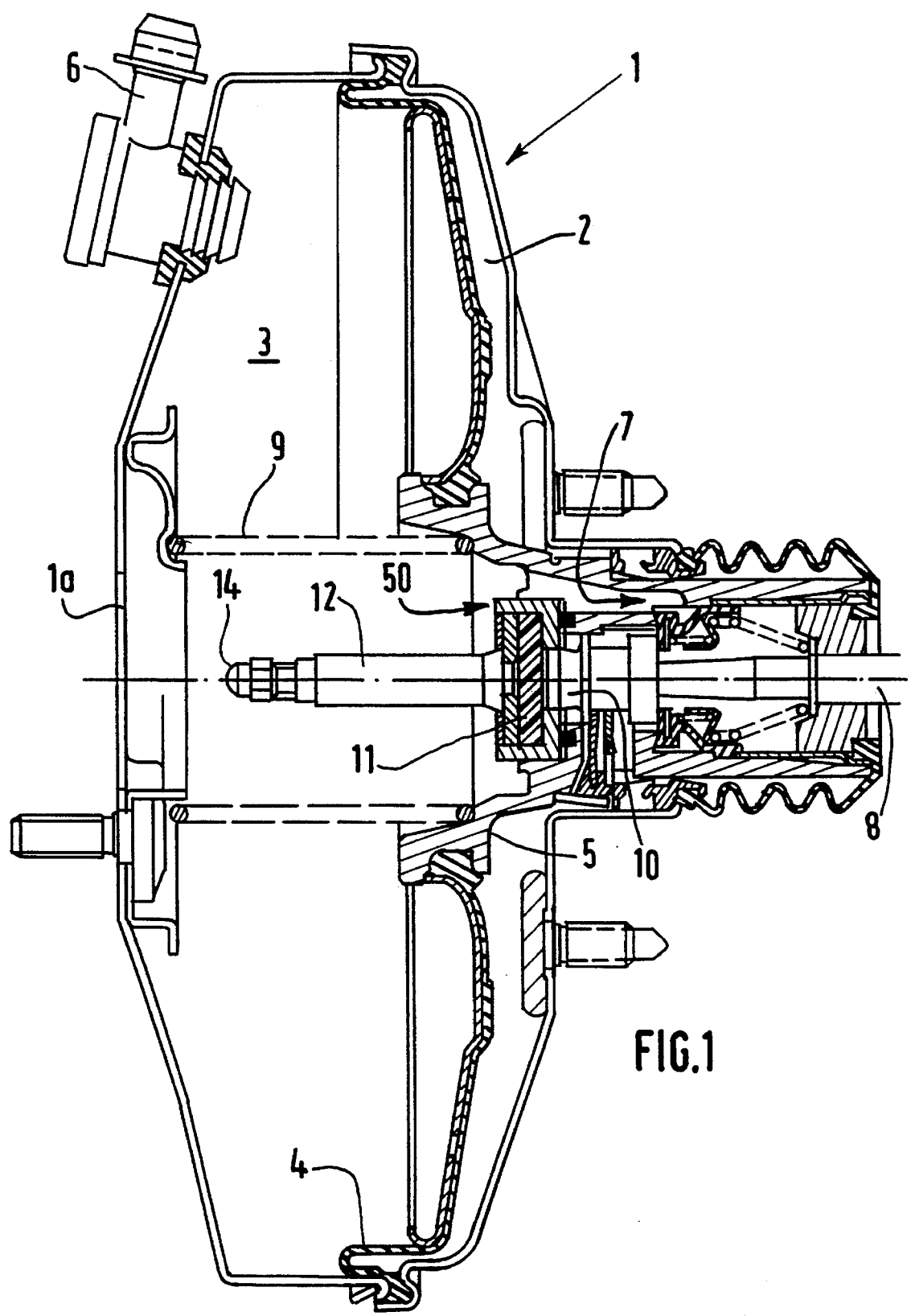

United States Patent [19]

Gautier et al.

[11] Patent Number: 5,493,948
[45] Date of Patent: Feb. 27, 1996

[54] FORCE TRANSMISSION DEVICE FOR A BOOSTER WITH JUMP ADJUSTMENT

[75] Inventors: Jean Pierre Gautier; Ulysse Verbo, both of Aulnay-sous-Bois; Miguel Perez Revilla, Argenteuil, all of France

[73] Assignee: Bendix Europe Services Techniques, Drancy, France

[21] Appl. No.: 50,243

[22] PCT Filed: Mar. 24, 1993

[86] PCT No.: PCT/FR93/00293

§ 371 Date: May 6, 1993

§ 102(e) Date: May 6, 1993

[87] PCT Pub. No.: WO93/22172

PCT Pub. Date: Nov. 11, 1993

[30] Foreign Application Priority Data

Apr. 30, 1992 [FR] France ................................. 92 05325

[51] Int. Cl.⁶ ........................................................ F15B 9/10
[52] U.S. Cl. .................................................... 91/369.2
[58] Field of Search ............................. 91/369.2, 376 R

[56] References Cited

U.S. PATENT DOCUMENTS

| 3,143,926 | 8/1964 | Stelzer | 91/369.2 |
|---|---|---|---|
| 4,271,670 | 6/1981 | Ohmi | 60/554 |
| 4,354,353 | 10/1982 | Laue | 91/369.2 X |
| 4,586,427 | 5/1986 | Thiel | 91/369.2 |
| 4,770,082 | 9/1988 | Kawasumi | 91/369.2 X |
| 4,984,506 | 1/1991 | Perez | 91/369.2 |
| 5,012,723 | 5/1991 | Gauthier | 91/369.2 |
| 5,016,520 | 5/1991 | Gautier | 91/369.2 X |
| 5,136,927 | 8/1992 | Rossigno et al. | 91/369.2 |

FOREIGN PATENT DOCUMENTS

| 0318681 | 6/1989 | European Pat. Off. . | |
| 1655429 | 11/1971 | Germany . | |
| 0202146 | 11/1983 | Japan | 91/369.2 |
| 0114151 | 7/1984 | Japan | 91/376 R |

OTHER PUBLICATIONS

Patent Abstract of Japan, vol. 8, No. 47 Mar. 2, 1984.

Primary Examiner—John E. Ryznic
Attorney, Agent, or Firm—Leo H. McCormick, Jr.; Larry J. Palguta

[57] ABSTRACT

The invention relates to means for adjusting the jump in a pneumatic braking assistance servomotor, said means including a cup (50) encircling the reaction disk (11) and a radial widening (13) integral with the push-rod (12). The adjustment is carried out by partial screwing of the cup in the piston or recoil of the push-rod without initial strain of the reaction disk (11).

2 Claims, 3 Drawing Sheets

FORCE TRANSMISSION DEVICE FOR A BOOSTER WITH JUMP ADJUSTMENT

This patent application is the national entry of International Patent Application PCT/FR93/00293 and has met the requirements of 35 U.S.C. 371.

The present invention relates to a force transmission device for a pneumatic brake-booster, comprising:

an operating rod which, starting from a position of rest, can undergo axial displacement through the action of an input force, said rod ending in a feeler having an axial end face forming a first upstream support surface;

a pneumatic piston movable in an axial direction from a position of rest through the action of a pressure difference controlled by the axial displacement of the operating rod, said piston being able to receive a minimum non-zero thrust for a minimum non-zero active displacement of the control rod and having an annular axial surface which surrounds the first upstream support surface and constitutes a second upstream support surface, a reaction disk having an upstream face and a downstream face, the upstream face being intended to receive forces applied by the first and second upstream support surfaces, and the downstream face being intended to retransmit these forces, a thrust rod having a first end fastened to a radial widening which offers a first downstream support surface bearing against the downstream face of the reaction disk, this rod having a second end adapted to apply an output force greater than the input force, and regulation means for adjusting said minimum thrust to a desired final value by regulation of the distance between a support surface and the corresponding face of the reaction disk, said regulation means comprising a cup gripping the reaction disk, having a screw thread, and enabling said distance to be modified by screwing-in or screwing-out, which can be effected downstream of the reaction disk.

A device of this kind is for example described in U.S. Pat. No. 4,984,506, the teaching of which permits regulation of the minimum thrust received by the piston, which is known as "jump", by screwing-in or screwing-out, which is relatively easy because it is effected downstream of the reaction disk, that is to say on the thrust rod side.

Despite its advantages and effectiveness, this known technique nevertheless suffers from a residual defect due to the fact that the regulation leads to prestressing of the reaction disk.

Not only may this prestressing constitute a cause of premature wear of the reaction disk, but it also gives rise to an initial thrust on the thrust rod, which has a parasitic effect in the value of the jump itself.

Moreover, a force transmission device of the type described previously, in which the regulation means are designed to allow the first upstream support surface to be moved away from the first end of the thrust rod without relative displacement of the first downstream support surface in relation to the second upstream support surface is described in U.S. Pat. No. 4,271,670.

Although this known device thus solves the problems previously expounded as regards the device of U.S. Pat. No. 4,984,506, it calls upon four different elements whose relative rotation has to be controlled, namely the cup, an external ring screwed onto the cup, the thrust rod, and a screw for varying the length of the thrust rod.

In this context the object of the present invention is to provide a force transmission device for a booster which will permit the simplest possible regulation of the jump and nevertheless not entail undesirable secondary effects.

To this end the invention is essentially characterized in that the cup has a cylindrical rim, a radial extension in which a central aperture is formed and which has an annular internal surface which constitutes the first downstream support surface, and an internally threaded cylindrical sleeve which leads into the central aperture and into which is screwed the first end of the thrust rod, this end constituting a second downstream support surface.

Figure 2:
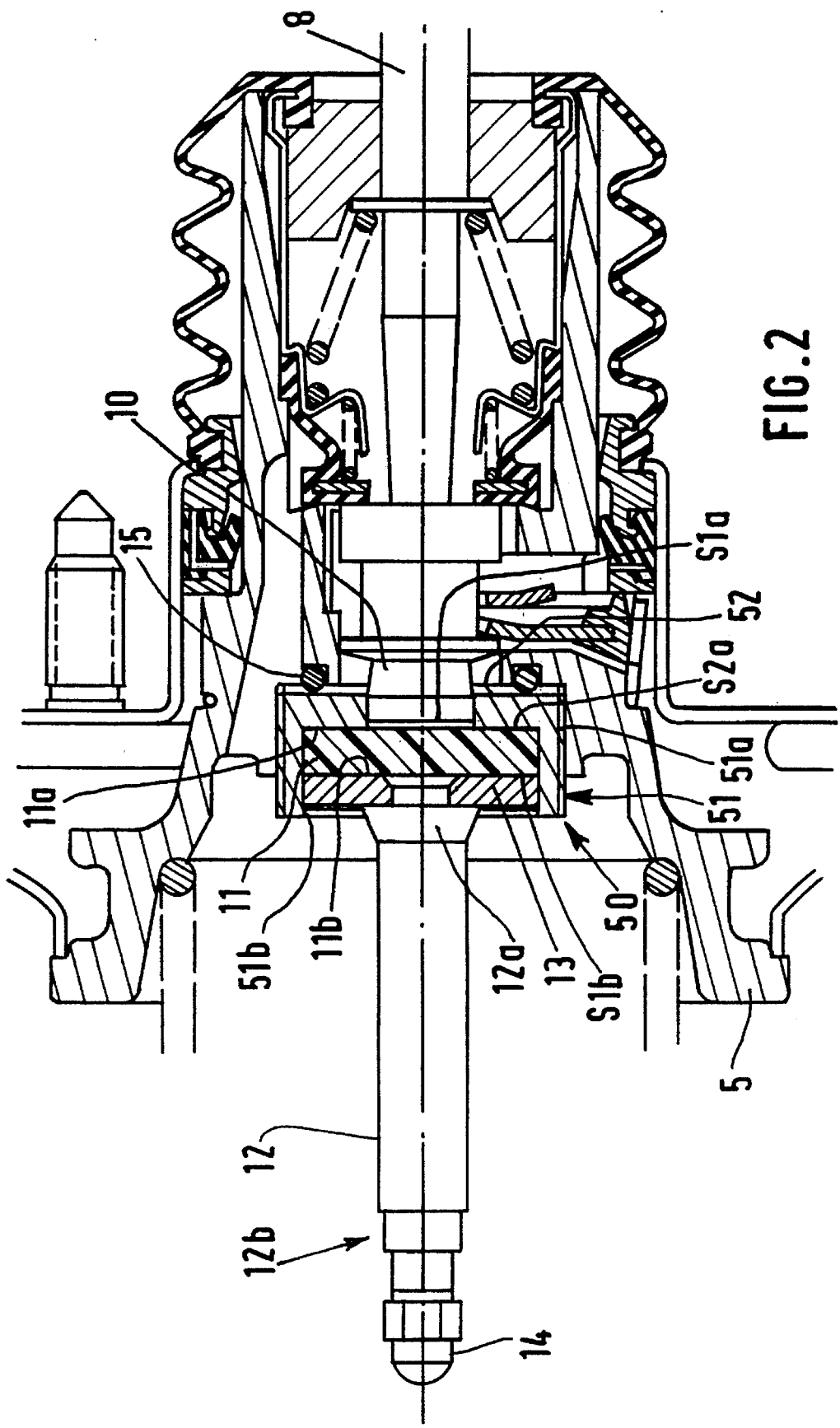
Figure 3:
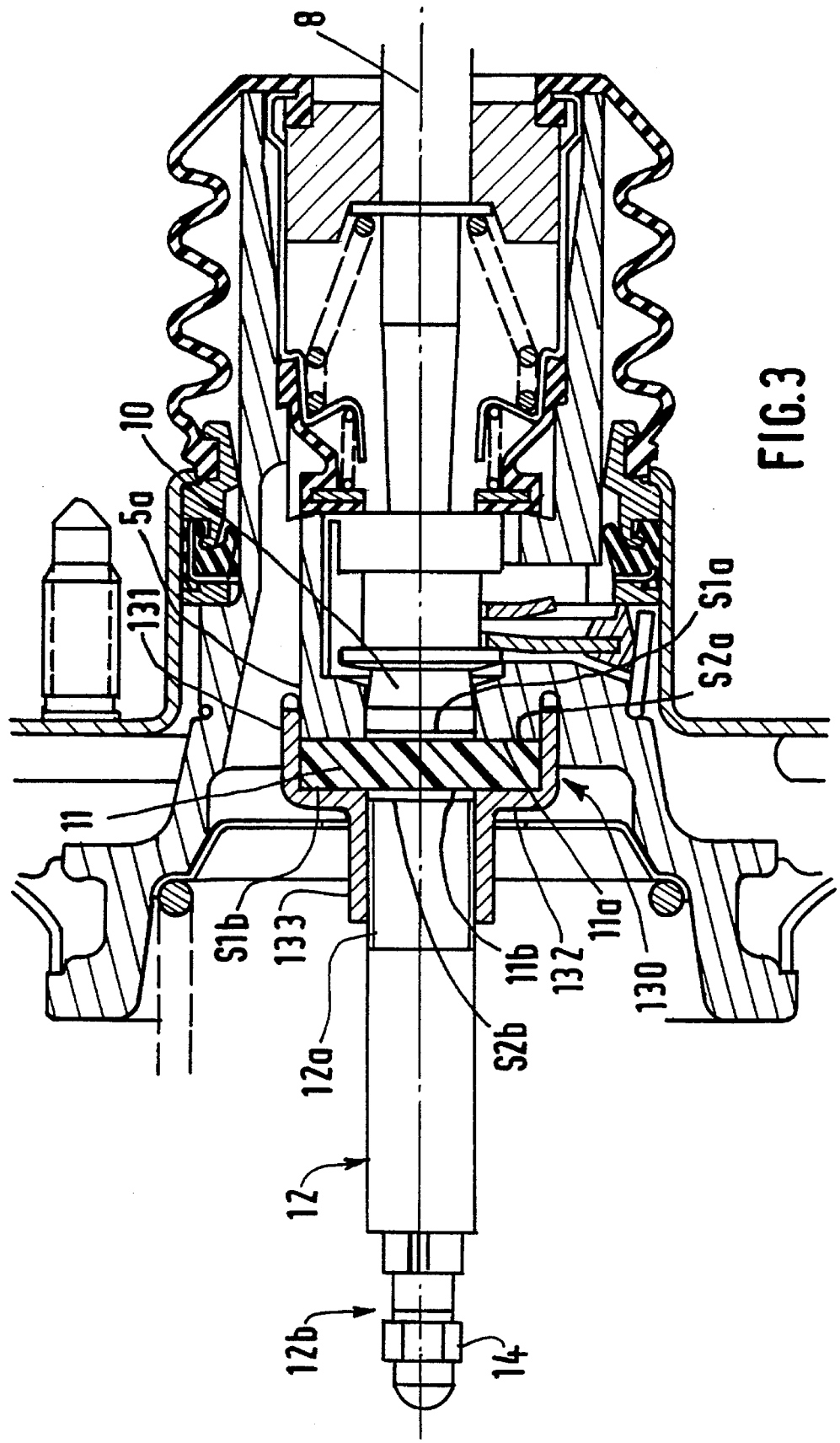

Other features and advantages of the invention will become clear in the description given below by way of indication and without limitation, with reference to the drawings, in which:

FIG. 1 is a view in section of a booster according to a first, unclaimed, embodiment of the invention, FIG. 2 is a detailed view in section of a device according to the first embodiment of the invention, and FIG. 3 is a detailed view in section of a device according to a second embodiment of the invention.

The invention relates to an improvement made to pneumatic brake-boosters, of which one example according to the invention is illustrated in FIG. 1.

However, since the general constitution and the operation of boosters are well known to those versed in the art, they will be rapidly recalled here only to permit full understanding of the improvement made by the invention.

Schematically, a booster comprises a rigid casing 1 separated, sealingly during operation, into two chambers 2 and 3 by a diaphragm 4 fastened to a piston 5 movable inside the casing.

The front chamber 3, whose front face is sealingly closed during operation by being mounted on a master cylinder (not shown) is continuously connected to a vacuum source (not shown) by way of a connection 6.

The pressure in the rear chamber 2 is controlled by a valve 7 operated by an operating rod 8 connected to the brake pedal.

When the operating rod 8 is in the position of rest, that is to say in the present case drawn to the right, the valve 7 establishes communication between the two chambers 2 and 3 of the booster.

As the rear chamber 3 is then subjected to the same vacuum as the front chamber 2, the piston 5 is pushed back towards the right, into the position of rest, by a spring 9.

The actuation of the operating rod towards the left has the effect, in a first stage, of moving the valve 7 so that it will isolate the chambers 2 and 3 from one another and then, in a second stage, of moving said valve in such a manner that it opens the rear chamber 3 to atmospheric pressure.

The difference in pressure between the two chambers, which then acts on the diaphragm 4, exerts on the piston 5 a thrust which tends to move it to the left, compressing the spring 9.

The braking force which is applied, through a plunger 10, by the operating rod 8 to the master cylinder, and the brake boosting force resulting from the thrust of the piston 5 are applied to the upstream (right-hand) face of a reaction disk 11, whose downstream (left-hand) face retransmits these forces to the thrust rod 12, the function of which is to operate the master cylinder itself.

The boosting force applied by the piston 5 occurs in fact only after a non-zero axial displacement of the operating rod 8 and, when it does occur, assumes a non-zero minimum value known as "jump", which the invention seeks to regulate in a simple, effective manner.

The invention, which relates essentially to the force transmission chain, formed conjointly by the operating rod 8, the plunger 10, the piston 5, the reaction disk 11 and the thrust rod 12, can now be described in detail with reference to FIGS. 2 and 3.

The feeler 10 has an axial end face S1a which constitutes a first upstream support surface, while the piston has an axial annular surface S2a surrounding the face S1a of the feeler and constituting a second upstream support surface.

The reaction disk 11 has an upstream face 11a and a downstream face 11b, the upstream face 11a being intended to receive the forces applied by the first and second upstream support surfaces S1a and S2a.

The first end 12a of the thrust rod 12 is fastened to a rigid radial widening 13, which offers a first downstream support surface S1b bearing against the down-stream face 11b of the reaction disk 11.

At its second end 12b the thrust rod 12 terminates in an axial screw 14 intended to permit the regulation of the length of said rod.

In the first embodiment (FIG. 1) the piston 5 comprises an additional component having the form of a cup 50 functionally similar to a part of the piston 5.

This cup has on the one hand a substantially cylindrical rim 51 having a gripping profile and an external screw thread 51a by which it is screwed onto the piston, and on the other hand an axially directed wall 52 provided with a central aperture through which the feeler 10 passes, the internal annular surface of said wall 52 constituting the second upstream support surface S2a.

In addition, the rim 51 has a slight radial constriction 51b enabling the cup to grip the stack formed by the reaction disk 11 and the radial widening 13.

Finally, an elastic O-ring seal 15 is provided between the cup 50 and the remainder of the piston 5 in order to ensure sealing between these two parts.

The conditions under which this arrangement develops all its advantages are as follows.

Since the value of the jump can in known manner be modified by modification of the distance between the face S1a of the feeler and the upstream face 11a of the reaction disk 11 under the conditions of equilibrium illustrated in FIG. 2, the invention provides for this distance to be given, by design, a value—calculated on the assumption that the cup 50 is screwed fully into the piston—which is lower than that at which the jump assumes the desired final value.

It is then sufficient, during the mounting of the booster, to screw the cup 50 only to the point where the jump reaches its desired final value, or to screw the cup out if it has been screwed fully in.

Inasmuch as the cup 50 carries both the radial widening 13 and the reaction disk 11, said cup can be screwed in or out without modifying the distance separating the first downstream support surface S1b from the second upstream support surface S2a.

The regulation of the jump can thus be effected during the mounting of the booster in the following manner (FIG. 1).

A sleeve carrying an outer clamping bush, an inner clamping member and a gauge is introduced through the opening 1a of the casing 1 into the space formed by the interior of the spring 9.

This sleeve sealingly closes the chamber 3, and said chamber is brought into communication with a vacuum source.

Calibrated forces are then applied to the operating rod 8, while the corresponding output forces applied by the thrust rod 12 are measured.

The actual value of the jump and its variation from its desired value thus having been determined, in a manner known per se, the clamping bush is operated to rotate the cup 50 and make the necessary correction.

Finally, after conventional measurement of the values to be adjusted, the inner clamping member acts on the screw 14 to make this adjustment, while the cup 50 and the rod 12 are held fast in respect of rotation.

In the second embodiment of the invention (FIG. 3), the second upstream support surface S2a is formed by the body of the piston 5 itself, and the first downstream support surface S1b is formed by the inner annular surface of a radial extension 132 of a cup 130.

This cup has a cylindrical rim 131 which grips the reaction disk 11 and is engaged in a space 5a in the piston.

At its center the wall 132 has an aperture into which leads an axially directed internally threaded cylindrical sleeve 133, into which is screwed the first end 12a of the thrust rod 12, this end forming a second downstream support surface S2b.

In this second embodiment of the invention the jump can be adjusted by screwing out the thrust rod 12 in the sleeve 133 from an initial position, in which the downstream support surfaces S1b and S2b are coplanar, without any relative displacement of the first downstream support surface S1b in relation to the second upstream support surface S2a, and therefore without stressing the reaction disk 11.

We claim:

1. A force transmission device for a pneumatic brake booster, comprising:

an operating rod which, starting from a position of rest, can undergo axial displacement through the action of an input force, said rod ending in a feeler having an axial end face constituting a first upstream support surface;

a pneumatic piston movable in an axial direction from a position of rest through the action of a pressure difference controlled by the axial displacement of the operating rod, said piston being able to receive a minimum non-zero thrust for a minimum non-zero active displacement of the operating rod and having an annular axial surface which surrounds the first upstream support surface and constitutes a second upstream support surface;

a reaction disk having an upstream face and a downstream face, the upstream face being intended to receive forces applied by the first and second upstream support surfaces, and the downstream face being intended to retransmit the forces;

a thrust rod having a first end connected with a cup which provides a first downstream support surface bearing against the downstream face of the reaction disk, the thrust rod having a second end adapted to apply an output force greater than the input force; and regulation means for adjusting said minimum thrust to a desired final value by regulation of the distance between a support surface and the corresponding face of the reaction disk, said regulation means comprising the cup which grips the reaction disk, the cup having a screw thread and enabling said distance to be modified by screwing-in or screwing-out, which can be effected downstream of the reaction disk, and the regulation means being designed to permit the first upstream support surface to be moved away from the first end of the thrust rod without relative displacement of the first downstream support surface in relation to the second upstream support surface, wherein said cup comprises a cylindrical rim, a radial extension provided with a central aperture and having an annular internal surface which constitutes the first downstream support surface, and an internally threaded cylindrical sleeve which leads into the central aperture and into which is screwed the first end of the thrust rod, the first end of the thrust rod constituting a second downstream support surface.

2. The device according to claim 1, wherein said regulation means comprises means for varying the length of the thrust rod.

* * * * *